(12) United States Patent
Lee

(10) Patent No.: US 7,629,066 B2
(45) Date of Patent: Dec. 8, 2009

(54) FUEL CELL SYSTEM CONFIGURED TO DETECT AND CONTROL EXCESS LOAD USE

(75) Inventor: Dong-Yun Lee, Suwon-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 717 days.

(21) Appl. No.: 11/157,900

(22) Filed: Jun. 20, 2005

(65) Prior Publication Data

US 2005/0287405 A1 Dec. 29, 2005

(30) Foreign Application Priority Data

Jun. 29, 2004 (KR) .................. 10-2004-0049296

(51) Int. Cl.
*H01M 8/18* (2006.01)
(52) U.S. Cl. .................. 429/19; 429/21; 429/23
(58) Field of Classification Search .............. 429/17, 429/19, 21, 22, 13, 23
See application file for complete search history.

(56) References Cited

U.S. PATENT DOCUMENTS

| | | | |
|---|---|---|---|
| 5,006,425 A * | 4/1991 | Takabayashi .......... | 429/23 |
| 2004/0180247 A1 * | 9/2004 | Higashiyama et al. ...... | 429/19 |
| 2004/0197614 A1 * | 10/2004 | Simpson et al. ............ | 429/17 |
| 2006/0204801 A1 * | 9/2006 | Sandaker .................. | 429/22 |

FOREIGN PATENT DOCUMENTS

| | | |
|---|---|---|
| JP | 2000-285938 A | 10/2000 |
| JP | 2004-087425 | 3/2004 |
| JP | 2004-165093 | 6/2004 |
| WO | WO 02/069428 A1 | 9/2002 |

OTHER PUBLICATIONS

Japanese Office action dated May 12, 2009, for corresponding Japanese application 2005-177435, noting listed references in this IDS, as well as JP 2000-285938 and WO 02/069428 previously filed in an IDS dated Mar. 9, 2009.

* cited by examiner

*Primary Examiner*—Raymond Alejandro
(74) *Attorney, Agent, or Firm*—Christie, Parker & Hale, LLP

(57) ABSTRACT

An adaptable fuel cell system includes a stack generating electric energy through an electrochemical reaction between hydrogen and oxygen and applying the electric energy to a load. A reformer reforms a fuel to generate the hydrogen supplied to the stack. A fuel supply unit supplies the fuel to the reformer. An oxygen supply unit supplies the oxygen to the stack. A first buffer unit electrically coupled to the load applies an auxiliary power to the load based on usage electric energy of the load. A second buffer unit coupled to the reformer and the stack adjusts the hydrogen supplied from the reformer to the stack based on the usage electric energy of the load. In one embodiment, a centralized control unit detects a reference electric energy of the stack and the usage electric energy of the load and controls the buffer units based on the usage electric energy.

5 Claims, 3 Drawing Sheets

FUEL CELL SYSTEM CONFIGURED TO DETECT AND CONTROL EXCESS LOAD USE

CROSS REFERENCE TO RELATED APPLICATION

This application claims priority to and the benefit of Korean Patent Application No. 10-2004-0049296 filed in the Korean Intellectual Property Office on Jun. 29, 2004, the entire content of which is incorporated herein by reference.

FIELD OF THE INVENTION

The present invention relates to a fuel cell system, and more particularly to, a fuel cell system having an improved electrical response characteristic capable of responding to electric energy requirements of a load.

BACKGROUND OF THE INVENTION

A fuel cell is an electricity generating system converting the chemical reaction energy of a chemical reaction between oxygen and hydrogen into electric energy. The hydrogen used in the reaction may be contained in hydrocarbon materials such as methanol, ethanol, and natural gas.

Recently developed polymer electrolyte membrane fuel cells (PEMFC) have excellent output characteristic, low operating temperatures, and fast starting and response characteristics. So, the PEMFC has a wide range of applications and may be used in a mobile power source for vehicles, in a distributed power source for buildings, or in a small power source for electronic apparatus.

A fuel cell system employing the PEMFC includes a main body, also referred to as a stack, a reformer for reforming a fuel to generate hydrogen and for supplying the hydrogen to the stack, and an air pump or a fan for supplying oxygen to the stack.

The stack generates electric energy at a predetermined output level through an electrochemical reaction between the hydrogen, supplied from the reformer, and the oxygen, supplied by the air pump or fan, and delivers the electric energy to a predetermined load.

The fuel cell system includes an auxiliary power supply device, such as a rechargeable secondary battery, for supplying an auxiliary power to the fuel pump and for starting up the fuel cell system. For example, at the time of starting up the fuel cell system, the fuel pump and some other parts are driven with the power supplied from the auxiliary power supply device.

In addition, in the conventional fuel cell system, in a case where electric energy required by the load exceeds the output electric energy of the stack and the fuel cell is in an electrically overloaded state, the auxiliary power supply device delivers the auxiliary power to the load. The electric energy required by the load is also referred to as a "usage electric energy." The auxiliary power applied to the load corresponds to the usage electric energy of the load exceeding the output electric energy of the stack.

However, in the conventional fuel cell system, because the electrically overloaded state of the fuel cell is remedied with the auxiliary power supply device applying the auxiliary power to the load, the auxiliary power supply device must produce a large amount of electrical power. This increases the operation cost of the entire fuel cell system.

SUMMARY OF THE INVENTION

The present invention provides a fuel cell system having an improved electrical response characteristic capable of handling an electrically overloaded fuel cell by using output electric energy from a stack.

One embodiment of the invention provides a fuel cell system including a stack generating electric energy through an electrochemical reaction between hydrogen and oxygen and applying the electric energy to a predetermined load, a reformer reforming a fuel to generate the required hydrogen and supplying the hydrogen to the stack, a fuel supply unit supplying the fuel to the reformer, an oxygen supply unit supplying the oxygen to the stack, and a buffer unit coupled to the reformer and the stack, wherein the buffer unit adjusts an amount of the hydrogen supplied from the reformer to the stack based on usage electric energy of the load.

In some embodiments, the buffer unit may include a storage unit located on a path between the reformer and the stack to store an amount of the hydrogen corresponding to excess usage electric energy exceeding a reference electric energy of the stack, and a hydrogen supply unit coupled to the storage unit to supply the hydrogen stored in the storage unit to the stack when the usage electric energy exceeds the reference electric energy.

In addition, the fuel supply unit may include a fuel tank storing the fuel, and a fuel pump coupled to the fuel tank to discharge the fuel stored in the fuel tank, wherein the fuel tank and the reformer are coupled together through a first supply line, and wherein the reformer and the stack are coupled together through a second supply line.

The oxygen supply line may include an air pump drawing in atmospheric air and supplying the air to the stack, where the air pump and the stack are coupled together through a third supply line.

The buffer unit may include a hydrogen tank located on the second supply line, the hydrogen tank having a cross sectional area larger than the second supply line and storing an amount of hydrogen corresponding to the usage electric energy exceeding a predetermined reference electric energy of the stack, and a hydrogen pump coupled to the hydrogen tank to supply the hydrogen stored in the hydrogen tank to the stack when the usage electric energy exceeds the reference electric energy.

The hydrogen tank may include an inlet and an outlet coupled to the second supply line.

The second supply line may be shaped like a pipe having a cross sectional area sufficient for supplying an amount of hydrogen corresponding to the reference electric energy to the stack while no load is applied to the hydrogen pump.

The stack may be constructed with a set of electric generators generating the electric energy.

Another embodiment provides a fuel cell system including a stack generating electric energy through an electrochemical reaction between hydrogen and oxygen and applying the electric energy to a predetermined load, a reformer reforming a fuel to generate the hydrogen and supplying the hydrogen to the stack, a fuel supply unit supplying the fuel to the reformer, an oxygen supply unit supplying the oxygen to the stack, a first buffer unit electrically coupled to the load to apply an auxiliary power to the load based on usage electric energy of the load, a second buffer unit coupled to the reformer and the stack to adjust an amount of hydrogen supplied from the reformer to the stack based on the usage electric energy of the load, and a control unit detecting a predetermined reference electric energy of the stack and the usage electric energy of the load and controlling the first and second buffer units based on the usage electric energy.

The first buffer unit may be constructed with a secondary battery which delivers to the load the auxiliary power corresponding to an excess usage electric energy that is equal to the amount of the usage electric energy exceeding the reference electric energy.

The second buffer unit may include a storage unit located on a path between the reformer and the stack to store an amount of hydrogen corresponding to the usage electric energy exceeding the reference electric energy of the stack, and a hydrogen supply unit coupled to the storage unit to supply the hydrogen stored in the storage unit to the stack when the usage electric energy exceeds the reference electric energy.

The storage unit may be a tank storing the hydrogen.

The hydrogen supply unit may be a pump discharging the hydrogen from the tank.

According to the embodiments of the present invention, it is possible to adapt to an increase in the electric energy usage of the load by adjusting the amount of hydrogen supplied to the stack. Therefore, it is possible to reduce the energy consumption of the auxiliary power supply and the operation cost of the overall fuel cell system.

DETAILED DESCRIPTION

Figure 1:
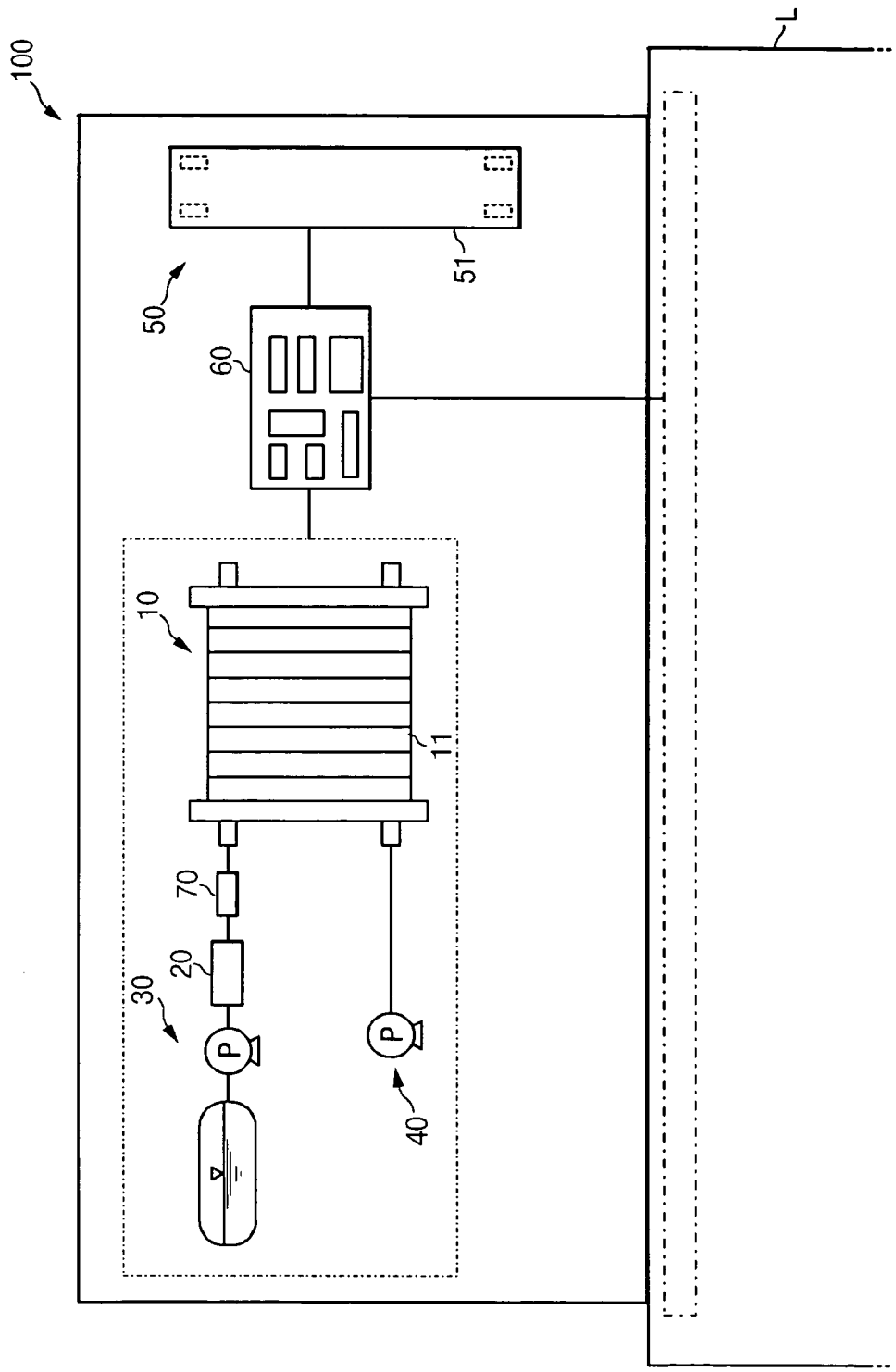
FIG. 1 is a block diagram of a fuel cell system according to an embodiment of the present invention.
Figure 2:
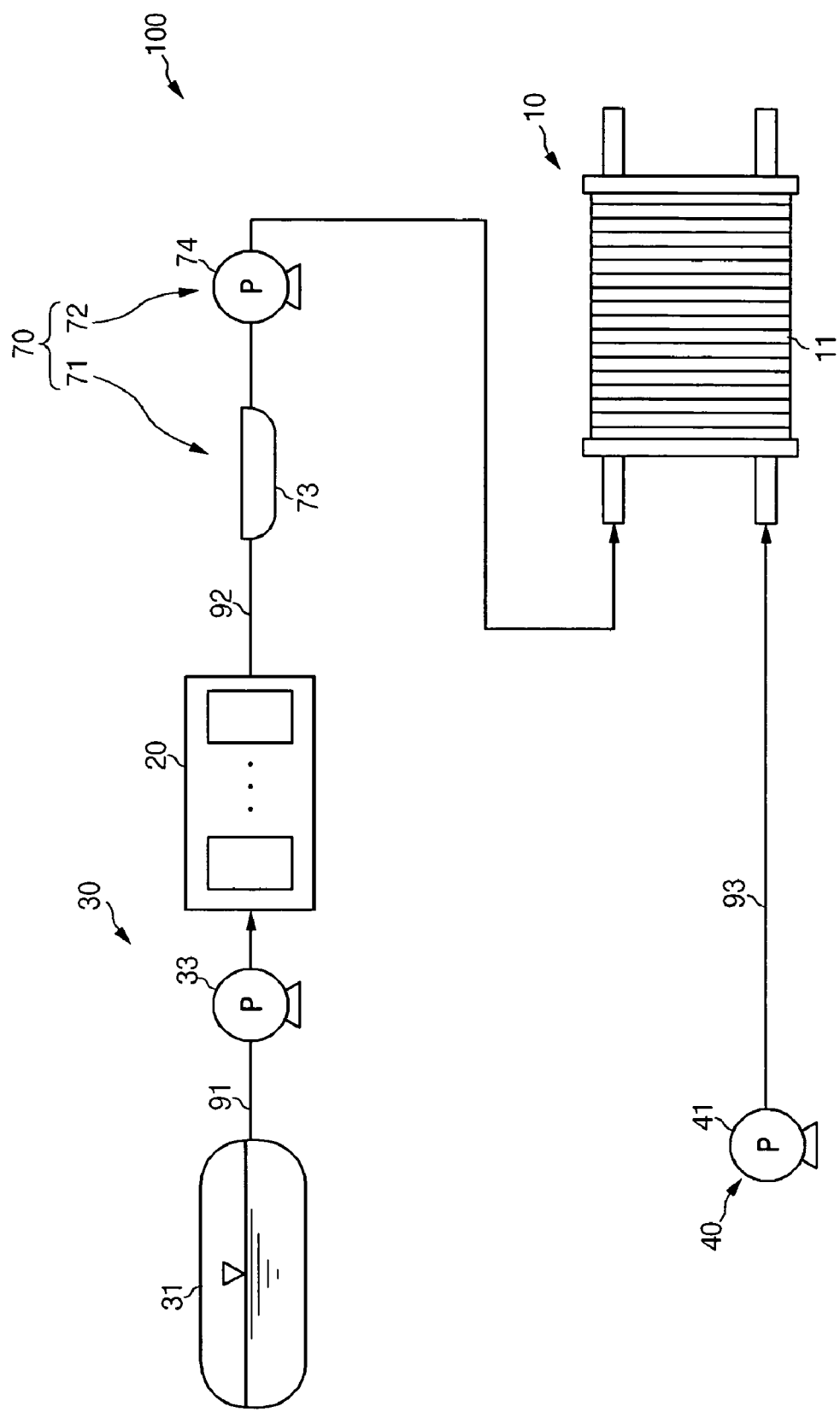
FIG. 2 is a detailed view of FIG. 1.

FIG. 1 is a block diagram illustrating a fuel cell system according to one embodiment of the present invention, and FIG. 2 is a detailed view of FIG. 1. The fuel cell system 100 is typically built within an electronic device such as a notebook, a personal computer, a PDA, a mobile terminal, or the like which constitute a load for the fuel cell system 100. The fuel cell system 100 is a system for generating electric energy through an electrochemical reaction between hydrogen and oxygen and supplying the electric energy to the load.

The fuel cell system 100 of the present invention may employ a PEMFC for generating hydrogen. The fuel used for the fuel cell system 100 may include a hydrogen-containing fuel such as methanol, ethanol, or natural gas. While the hydrogen-containing fuel may be a liquid or a gas, for convenience of description, only a liquid fuel is assumed in the discussion of the various embodiments.

The fuel cell system 100 may utilize pure oxygen stored in an additional storage device or air as an oxidant reacting with hydrogen. In the following description of the embodiments, air is used as the oxidant.

The fuel cell system 100 includes a stack 10 for generating electric energy through an electrochemical reaction between hydrogen and oxygen, a reformer 20 for reforming the fuel to generate hydrogen and for supplying the hydrogen to the stack 10, a fuel supply unit 30 for supplying the fuel to the reformer 20, and an oxygen supply unit 40 for supplying oxygen to the stack 10.

The stack 10 is electrically coupled to a load L to supply a usage electric energy required by the load L. The stack 10 includes at least one electricity generator 11 for generating electric energy through an electrochemical reaction between hydrogen and oxygen.

Each of the electricity generators 11 may be constructed by closely packing separators also referred to bipolar plates on both sides of a membrane-electrode assembly (MEA). Each of the electricity generators 11 is the smallest unit of a fuel cell.

In the embodiment shown in FIG. 1 and FIG. 2, a plurality or a set of the electricity generators 11 are sequentially stacked to construct the stack 10. The number of electricity generators 11 in a stack 10 depends on the size of the whole fuel cell system 100 and the type and characteristic of the load L. The stack 10 generates electric energy, which is determined based on the amount of hydrogen supplied from the reformer 20 and the average energy required to drive the load L. This amount of energy that corresponds to the average energy required to drive the load L is also referred to as a "reference electric energy" generated by the stack 10.

Because the stack 10 may have the same structure as the stack of the conventional PEMFC, a detailed description of the stack 10 is omitted.

The reformer 20 is a general reformer which generates hydrogen from a fuel through an electrochemical reaction using thermal energy and supplies the generated hydrogen to the stack 10. The reformer 20 has a structure for generating hydrogen from the fuel through a catalytic reaction and for reducing a concentration of carbon monoxide contained in the generated hydrogen. The catalytic reactions that may be used in the reformer 20 include steam reforming reactions, partial oxidation reactions, auto-thermal reactions, or the like. The concentration of carbon monoxide contained in the generated hydrogen may be reduced through a water-gas shift (WGS) reaction, a preferential oxidation (PROX) reaction, or a purification reaction of hydrogen with a separating membrane.

The reformer 20 may have the same structure as that of a reformer employed in a typical PEMFC fuel cell system. Therefore, detailed description of the reformer is omitted.

The fuel supply unit 30 includes a fuel tank 31 storing the fuel, and a fuel pump 33 coupled to the fuel tank 31 to discharge the fuel from the fuel tank 31.

The oxygen supply unit 40 includes an air pump 41 that draws in air and supplies the air to the stack 10 with a predetermined pumping pressure. The oxygen supply unit 40 may also include a fan.

In the fuel cell system 100, the stack 10, the reformer 20, the fuel supply unit 30, and the oxygen supply unit 40 may be coupled to one another through pipelines. More specifically, the fuel tank 31 of the fuel supply unit 30 and reformer 20 may be coupled to each other through a first supply line 91. The reformer 20 and the stack 10 may be coupled to each other through a second supply line 92. The air pump 41 of the oxygen supply unit 40 and the stack 10 may be coupled to each other through a third supply line 93.

The hydrogen generated by the reformer 20 is supplied to the electricity generators 11 of the stack 10 through the second supply line 92. Hydrogen may be driven to the electricity generators 11 by the pumping pressure of the fuel pump 33. The second supply line 92 may be a cylindrical pipe. The cross sectional area of the second supply line 92 may be such that the second supply line 92 can supply to the stack 10 an amount of hydrogen corresponding to the reference electric energy of the stack 10 by using a predetermined pumping pressure of the fuel pump 33.

In addition, the fuel cell system 100 includes a first buffer unit 50 in order to deliver the usage electric energy required by the load L. The first buffer unit 50 delivers an auxiliary power to the load L by using the fuel and air pumps 33, 41 during start-up of the fuel cell system 100. When the usage electric energy of the load L exceeds the reference electric energy of the stack 10, the first buffer unit 50 delivers to the load L the auxiliary power. The auxiliary power delivered to the load L corresponds to an "excess usage electric energy" of the load L defined as the usage electric energy of the load L in excess of the reference electric energy output by the stack 10.

The reference electric energy of the stack 10 is determined based on the amount of hydrogen supplied from the reformer 20 to the stack 10 and on the average usage electric energy required by the load L. When the load L, for example a notebook PC, starts up or when many software programs are executed on the notebook PC, the load L requires electric energy generally exceeding the average usage electric energy of the load L. At these times, the usage electric energy of the load L exceeds the reference electric energy of the stack 10 by the amount of the excess usage electric energy.

As a result, when the load L is using energy above its average usage, the reference electric energy of the stack 10 is less than the usage electric energy required by the load L. In this case, the first buffer unit 50 delivers to the load L the auxiliary power corresponding to the excess usage electric energy of the load L. The first buffer unit 50 may be a rechargeable secondary battery or a capacitor. In one embodiment, the first buffer unit 50 is a secondary battery 51.

The fuel cell system 100 also includes a control unit 60. The control unit 60 controls operations of the whole system. Particularly, the control unit 60 detects the reference electric energy of the stack 10 and the usage electric energy of the load L and based on the excess usage electric energy of the load L, drives of a second buffer unit 70 or controls the discharge of the first buffer unit 50.

The control unit 60 may be constructed with a microcomputer including inverters and converters for adjusting output power levels of the first buffer unit 50 and the stack 10 and control circuits for applying various control signals required to drive the whole system.

In an electrically overloaded state of the load L, when the usage electric energy of the load L exceeds the reference electric energy of the stack 10, the stack 10 cannot supply sufficient electric energy to the load L. Consequently, the first buffer unit 50 outputs to the stack 10 the auxiliary power depending on the amount of the excess usage electric energy of the load L.

The fuel cell system 100 according to the present invention includes the second buffer unit 70 capable of reducing an output power level of the first buffer unit 50 and enhancing the response characteristics of the stack 10 based on the usage electric energy of the load L. The second buffer unit 70 adjusts the amount of hydrogen supplied from the reformer 20 to the stack 10 in order to help the stack 10 to adapt to the usage electric energy of the load L. The second buffer unit 70 includes a storage unit 71 located on a path between the reformer 20 and the stack 10, and a hydrogen supply unit 72 coupled to the storage unit 71.

When hydrogen is supplied from the reformer 20 to the stack 10 through the second supply line 92, the storage unit 71 stores an additional amount of hydrogen corresponding to the excess usage electric energy of the load L or the amount of the usage energy of the load L exceeding the reference electric energy of the stack 10.

The storage unit 71 having a hydrogen storage space is located on the second supply line 92 coupling together the reformer 20 and the stack 10. The second supply line 92 is the line supplying the hydrogen from the reformer 20 to the stack 10.

Figure 3:
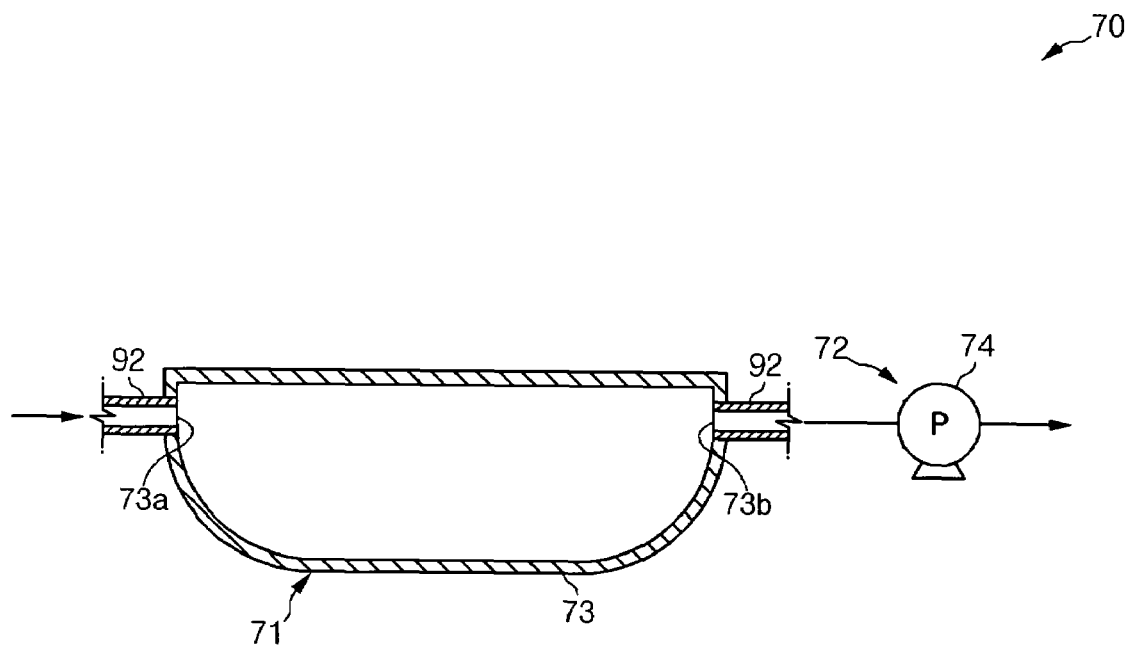
FIG. 3 is a cross sectional view of a second buffer unit shown in FIG. 2.

FIG. 3 shows a cross-sectional view of the second buffer unit 70. As shown in FIG. 3, the storage unit 71 located on the second supply line 92 may be constructed with a hydrogen tank 73 having a cross sectional area larger than the second supply line 92.

The hydrogen tank 73 includes an inlet 73a and an outlet 73b located on the second supply line 92. The inlet 73a is coupled to the reformer 20 through the second supply line 92, and the outlet 73b is coupled to the stack 10 through the second supply line 92.

When the usage electric energy of the load L exceeds the reference electric energy of the stack 10, the hydrogen supply unit 72 supplies to the stack 10 an amount of hydrogen corresponding to the excess amount of the usage electric energy. This hydrogen is supplied from the hydrogen stored in the hydrogen tank 73 of the storage unit 71.

The hydrogen supply unit 72 may be constructed with a hydrogen pump 74 shown in FIG. 2 and in FIG. 3. The hydrogen pump 74 is coupled to the hydrogen tank 73 to supply the hydrogen stored in the hydrogen tank 73 to the stack 10 by using a pumping pressure of the hydrogen pump 74.

When the control unit 60 determines that the usage electric energy of the load L exceeds the reference electric energy of the stack 10, the control unit 60 drives the hydrogen pump 74. As a result, the hydrogen pump 74 supplies to the stack 10 the excess amount of hydrogen stored in the hydrogen tank 73 by using a predetermined pumping pressure of the hydrogen pump 74. This is in addition to the amount of hydrogen supplied to the stack 10 by using the pumping pressure of the fuel pump 33. When the control unit 60 determines that the usage electric energy of the load L does not exceed the reference electric energy of the stack 10, the control unit 60 prevents the hydrogen pump 74 from pumping. Because the pump 74 is maintained in a non-driven state, only the predetermined amount of hydrogen generated from the reformer 20 is supplied to the stack 10 through the hydrogen tank 73 and the second supply line 92.

The fuel cell system 100, operates as follows. At start-up, the control unit 60 causes the first buffer unit 50 to apply power to the fuel pump 33. With the fuel pump 33 driven, the fuel stored in the fuel tank 31 is supplied to the reformer 20 through the first supply line 91.

The reformer 20 generates hydrogen from the fuel through a chemical catalytic reaction using thermal energy and supplies the hydrogen to the electricity generators 11 of the stack 10 through the second supply line 92. Hydrogen is forced to flow along the second supply line 92 by the pumping pressure of the fuel pump 33, so that a portion of the hydrogen is stored in the hydrogen tank 73 and an amount of the hydrogen corresponding to the reference electric energy of the stack 10 is supplied to the stack 10.

At the same time, the control unit 60 causes the first buffer unit 50 to apply an auxiliary power to the air pump 41. With the air pump 41 working, air is supplied to the electric generators 11 of the stack 10 through the third supply line 93.

The electricity generators 11 of the stack 10 generate the reference electric energy of the stack 10 through an electrochemical reaction between the hydrogen from the reformer 20 and oxygen contained in the air. The stack 10 outputs the generated electric energy to the load L.

During the process described above, the control unit 60 detects the reference electric energy of the stack 10 and the usage electric energy required by the load L. Based on the detected reference and usage electric energies, the control unit 60 determines whether or not the usage electric energy exceeds the reference electric energy. If the usage electric energy exceeds the reference electric energy, that is, if the load L is in an electrically overloaded state, the control unit 60 causes either the first buffer unit 50 or the stack 10 to apply either the auxiliary power or excess electric energy to the third supply pump 74.

As a result, in addition to the hydrogen supplied to the electricity generators 11 of the stack 10 through the second supply line 92 by using the pumping pressure of the fuel pump 33, an amount of hydrogen corresponding to the excess usage electric energy of the load L is also supplied from the hydrogen pump 74 to the electricity generators 11 of the stack 10 by using the pumping pressure of the hydrogen pump 74. During this process, an amount of air corresponding to the amount of the supplied hydrogen is also supplied to the electricity generators 11 of the stack 10 by using the air pump 41. As a result, the stack 10 generates the excess usage electric energy and outputs this energy to the load L.

Based on the determination of the control unit 60, if the usage electric energy of the load L does not exceed the reference electric energy of the stack 10, the control unit 60 prevents the hydrogen pump 74 from being driven. Therefore, only the amount of hydrogen generated from the reformer 20 corresponding to the reference electric energy is supplied to the electricity generators 11 of the stack 10 through the second supply line 92 by using the pumping pressure of the fuel pump 33. The stack 10 generates the electric energy corresponding to the reference electric energy and outputs this electric energy to the load L.

Accordingly, the fuel cell system 10 of the present invention speedily adapts to an electrically overloaded state of the load L by adjusting the amount of hydrogen supplied to the stack 10 through the second buffer unit 70 and thus adjusting the output electric energy of the stack 10. As a result, it is possible to reduce energy consumption of the first buffer 50 and to adaptively supply electric energy corresponding to a variable usage electric energy of the load L.

Although exemplary embodiments of the present invention have been described, the present invention is not limited to the embodiments described, but may be modified in various forms without departing from the scope of the appended claims, the detailed description, and the accompanying drawings of the present invention. Therefore, it is natural that such modifications belong to the scope of the present invention.

What is claimed is:

1. A fuel cell system for generating electric energy through an electrochemical reaction between hydrogen and oxygen, the system comprising:
   a stack for generating electric energy and for applying the electric energy to a load;
   a reformer for reforming a fuel to generate the hydrogen and for supplying the hydrogen to the stack;
   a fuel supply unit for supplying the fuel to the reformer;
   an oxygen supply unit for supplying the oxygen to the stack;
   a first buffer unit electrically coupled to the load, the first buffer for applying an auxiliary power to the load based on an excess use corresponding to an actual energy use of the load in excess of an average energy use of the load;
   a second buffer unit coupled to the reformer and the stack, the second buffer unit for adjusting an amount of the hydrogen supplied from the reformer to the stack based on the excess use, the second buffer unit being in series with a single supply line for supplying the hydrogen between the reformer and the stack; and
   a control unit coupled to the load, to the first buffer unit and to the second buffer unit for detecting the excess use and for controlling the first buffer unit and the second buffer unit,
   wherein the second buffer unit is configured to retain a portion of the supplied hydrogen and to supply the retained portion in addition to the hydrogen being supplied via the single supply line to the stack based on an energy use of the stack.

2. The fuel cell system of claim 1, wherein the first buffer unit includes a secondary battery for delivering to the load an auxiliary power corresponding to the excess use.

3. The fuel cell system of claim 1, wherein the second buffer unit comprises:
   a storage unit located between the reformer and the stack, the storage unit for storing an amount of the hydrogen; and
   a hydrogen supply unit coupled to the storage unit, the hydrogen supply unit for supplying the hydrogen stored in the storage unit to the stack when the actual energy use exceeds the average energy use.

4. The fuel cell system of claim 3, wherein the storage unit includes a hydrogen tank for storing the hydrogen.

5. The fuel cell system of claim 4, wherein the hydrogen supply unit includes a hydrogen pump for discharging the hydrogen from the hydrogen tank.

* * * * *